US006370328B1

(12) United States Patent
Mottershead

(10) Patent No.: US 6,370,328 B1
(45) Date of Patent: Apr. 9, 2002

(54) WATER HEATING TANK WITH THERMOSIPHONIC CIRCULATION FOR IMPROVED HEAT RECOVERY RATE

(76) Inventor: Bernard J. Mottershead, 708 SW. 357th St., Federal Way, WA (US) 98023

( * ) Notice: Subject to any disclaimer, the term of this patent is extended or adjusted under 35 U.S.C. 154(b) by 0 days.

(21) Appl. No.: 09/285,375

(22) Filed: Apr. 2, 1999

Related U.S. Application Data

(63) Continuation-in-part of application No. 08/947,118, filed on Oct. 8, 1997, now abandoned.

(51) Int. Cl.[7] .............................. F24H 1/20; F24H 1/34; F24J 2/04
(52) U.S. Cl. ...................... 392/452; 392/454; 392/461; 126/639; 126/640; 126/362
(58) Field of Search ................... 392/452, 449–451, 392/454, 461; 126/638, 639, 640, 344, 361, 362

(56) References Cited

U.S. PATENT DOCUMENTS

| 1,583,342 A | * | 5/1926 | Dlugosch | |
|---|---|---|---|---|
| 2,784,291 A | * | 3/1957 | Harney | |
| 4,777,347 A | * | 10/1988 | Mottershead | 392/452 |
| 5,499,621 A | * | 3/1996 | Trihey | 126/361 |

* cited by examiner

Primary Examiner—Teresa Walberg
Assistant Examiner—Thor Campbell
(74) Attorney, Agent, or Firm—Delbert J. Barnard

(57) ABSTRACT

An electric water heater has a vertically disposed tank with a cold water inlet, a hot water outlet and at least one horizontally disposed elongated immersion heating element extending into the region of the tank between an upper region and a lower region. Each heating element is surrounded by an elongated closed end tubular sleeve having a plurality of lower openings distributed along the length of the sleeve below the heating element therein and a plurality of upper opening distributed along the length of the sleeve above the heating element. The total area of the upper openings is greater than the area of the lower openings to generate upon operation of the heating element an upwardly directed transverse flow of water in a direction from the lower openings to the upper openings along the entire length of the sleeve. A thermosiphon bypass check valve connected between the cold water inlet and the hot water outlet having a bypass conduit with one or more constrictions and a closure member. The operation of the bypass check valve along with the sleeve surrounding each element generates a thermosiphon effect which improves heat transfer to the water in the tank and thus the heat recovery rate.

22 Claims, 5 Drawing Sheets

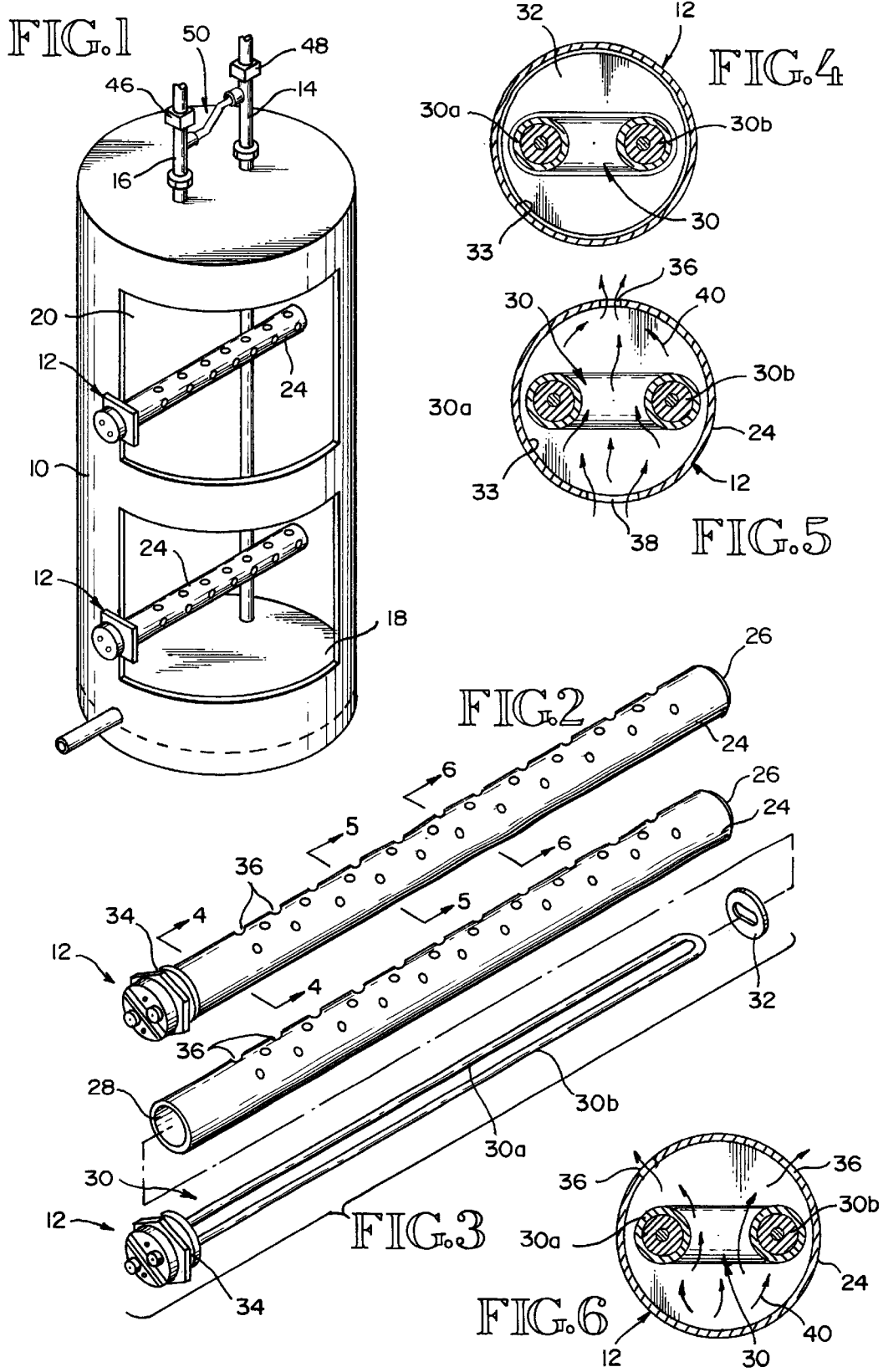

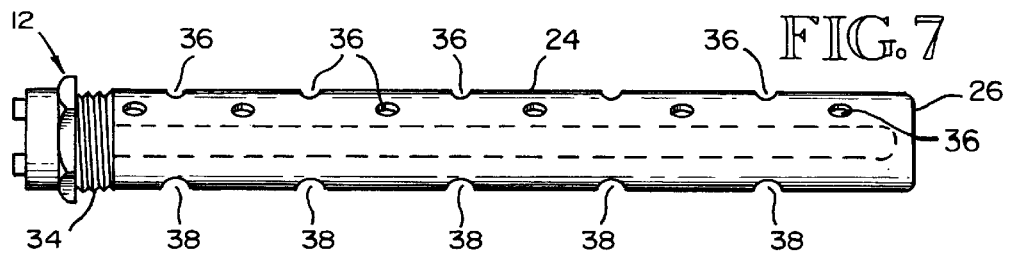
FIG. 7
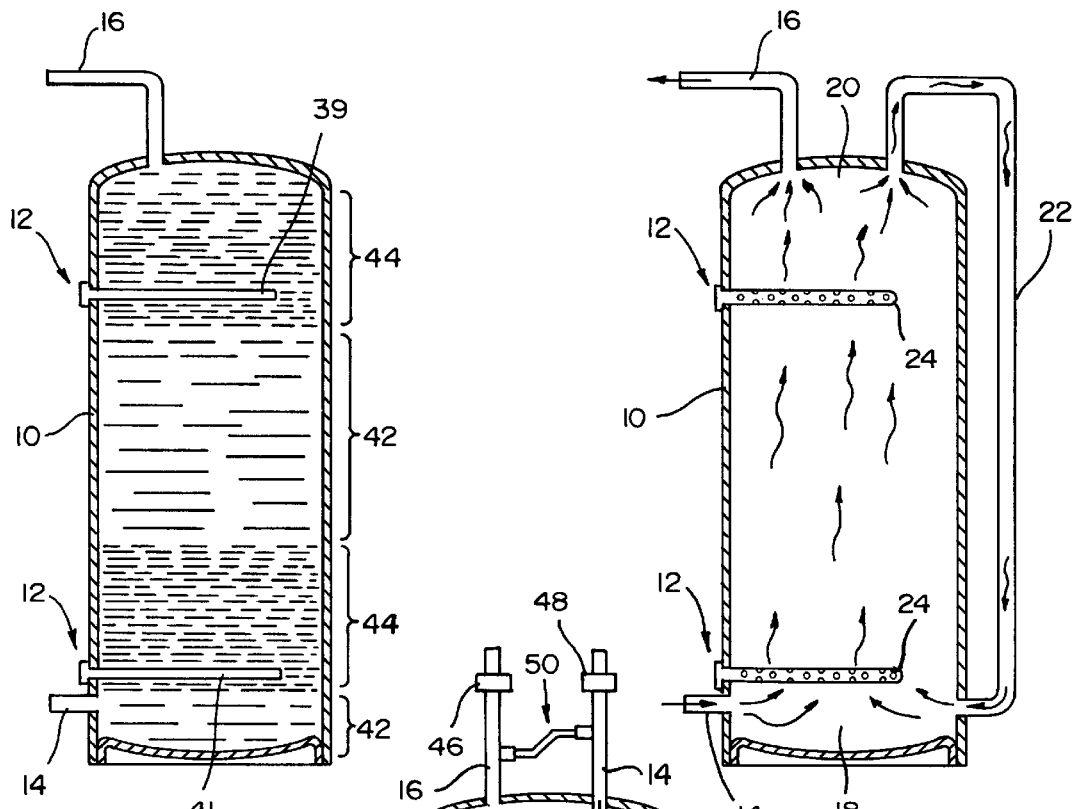
FIG. 8 PRIOR ART
FIG. 9 PRIOR ART
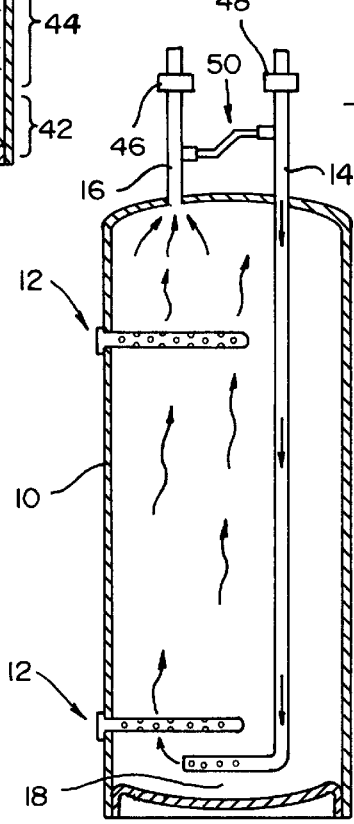
FIG. 10

WATER HEATING TANK WITH THERMOSIPHONIC CIRCULATION FOR IMPROVED HEAT RECOVERY RATE

CROSS-REFERENCE TO RELATED APPLICATION

This application is a continuation-in-part of application Ser. No. 08/947,118, filed Oct. 8, 1997 now abandoned, and also entitled "Water Heating Tank With Thermosiphonic Circulation For Improved Heat Recovery Rate".

TECHNICAL FIELD

This application relates to water heaters, and particularly, to devices that improve the heating efficiency of water heaters.

BACKGROUND OF THE INVENTION

Water heaters having internal electric resistance heating elements are well-known and in common use both domestically and commercially. Conventional designs of this type typically consist of a water tank into which cold water is introduced near its bottom, and water heated by the elements is removed from its top. The heating elements are usually in the form of two metallic sheathed electric resistance heating elements of the Calrod® type which extend into the tank from its inner sidewall and are fully exposed to the water in the tank.

Circulation of water inside the tank is normally very poor. This causes "layering" or layers of significantly cooler water to develop immediately below each element. The effect of layering on overall heating efficiency is two-fold. First, it impedes heat transfer from the elements to the water in the tank, which affects the heater's recovery rate in an undesirable manner. Second, to a certain extent, layering reduces the effective hot water holding capacity of the heater.

As a person skilled in the art would know, water heater recovery rate is directly related to a water heater's capacity to heat an amount of cold water introduced into the tank in response to removal of heated water. In order to overcome this heating inefficiency, I invented a thermosiphon apparatus readily adaptable to conventional water heater designs as shown in my U.S. Pat. No. 4,777,347. However, because the efficiency of water heaters and water heater construction is typically regulated by state standards, many water heater manufacturers were unwilling to modify their tanks in order to implement my thermosiphon apparatus. Therefore, there is a need for a thermosiphon apparatus that improves the efficiency of existing water heaters without involving modifications to the existing water heater tanks by the manufacturers.

SUMMARY OF THE INVENTION

The present invention is directed to a thermosiphon apparatus that satisfies this need for improving the efficiency of existing water heaters without involving modifications to the existing water heater tanks by the manufacturers. A thermosiphon apparatus having features of the present invention comprises a water tank, a cold water inlet for delivering cold water to a lower region of the tank, and a hot water outlet for removing heated water from an upper region of the tank. The cold water inlet is substantially immersed in the tank and extends generally from an upper wall of the tank to the lower region of the tank. Two electric heating elements, each immersed in water held in the tank, are positioned between the tank's upper and lower regions and extend generally horizontally inwardly into the tank from the tank's inner sidewall.

A tubular sleeve surrounds each heating element. The sleeve includes a first plurality of openings formed along the length of the sleeve above the heating element, and a second plurality of openings formed also along the length of the sleeve, but below the element. The total area of the upper openings exceeds the total area of the lower openings. Water trapped or held inside the sleeve and surrounding the element is quickly heated and the previously described arrangement of sleeve openings generates an upwardly directed flow of heated water.

An external bypass conduit is provided which has an upper end connecting to the cold water inlet, a lower end connecting to the hot water outlet, and a flow control valve inside the bypass conduit that regulates waterflow through the bypass conduit.

The holes or openings in each sleeve, in combination with the bypass conduit, generate a thermosiphon effect. Normally, and as a person skilled in the art would know, heat tends to rise upwardly. This means the upper region of the tank would naturally tend to be warmer than the lower region. However, the thermosiphon effect generated by the apparatus causes a "roll-over" of heated water from the upper to lower regions. This both eliminates layering in the tank and substantially improves the tank's recovery rate.

The invention may also be applied to a conventional gas water heater. In this form, an external bypass conduit is provided which has an upper end connecting to the cold water inlet, a lower end connecting to a hot water conduit, and a flow control valve inside the bypass conduit that regulates water flow through the bypass conduit. The hot water conduit can be the hot water outlet conduit or a separate additional conduit. The flow control valve prevents backflow through the bypass conduit when hot water is being drawn from the tank. When no water is being drawn from the tank, the flow control valve opens to allow thermosiphonic circulation from the lower hot water outlet connection to the upper cold water inlet connection without the flow control valve interfering with the thermosiphonic flow.

Operation of the apparatus will be more fully explained in the following description of the best mode for carrying out the invention, when read in conjunction with the accompanying drawings and claims.

BRIEF DESCRIPTION OF THE DRAWINGS

In the drawings, like reference numerals are used to designate like parts throughout the several views, and:

FIG. 1 is a pictorial view of a water heater modified by a thermosiphon apparatus that is constructed in accordance with a preferred embodiment of the invention, and has cut-away portions that show the placement of sleeve portions of the apparatus installed within the tank and surrounding the tank's electric heating elements;

FIG. 2 is an enlarged view of one of the tubular sleeve portions shown in FIG. 1;

FIG. 3 is an exploded view of FIG. 2;

FIG. 4 is a cross-sectional view taken substantially along line 4—4 of FIG. 2;

FIG. 5 is a cross-sectional view taken substantially along line 5—5 of FIG. 2 and shows the generation of an upward flow of heated water through the sleeve portion when water inside the sleeve is heated;

FIG. 6 is a cross-sectional view like FIG. 5 but is taken substantially along line 6—6 in FIG. 2;

FIG. 7 is a side elevational view of the sleeve shown in FIG. 2, with the location of the heating element surrounded thereby being shown by dashed lines;

FIG. 8 is a side view which schematically illustrates the basic construction of a conventional water heater that is unmodified by the present invention, and how layering of noncirculating water in the heater's tank occurs;

FIG. 9 is a view like FIG. 8, but shows the tank modified according to my prior invention, U.S. Pat. No. 4,777,347, and schematically shows how this prior invention improved the tank's recovery rate;

FIG. 10 is a view like FIG. 8, but shows a water heater configured according to the present invention, and schematically shows how the invention minimizes modifications to the existing tank and improves the tank's recovery rate;

BEST MODE FOR CARRYING OUT THE INVENTION

Figure 11:
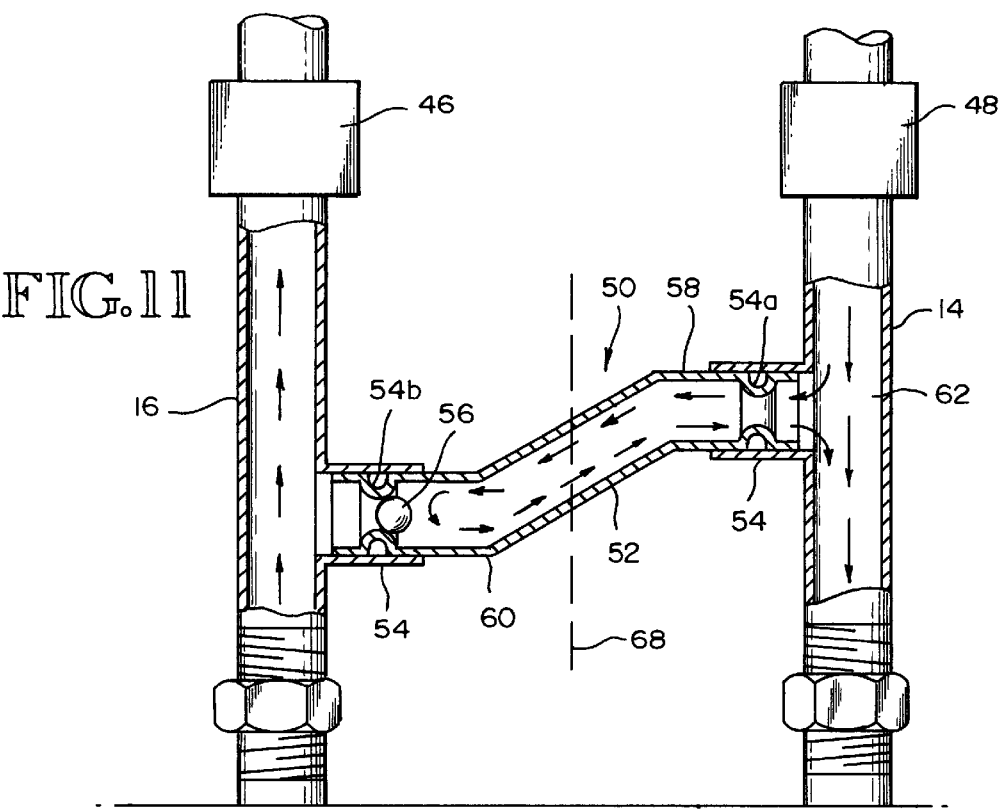
FIG. 11 is an enlarged side view of the thermosiphon bypass valve shown in FIG. 1 operating in a closed position.

Referring now to the drawings, and first to FIG. 1, therein is shown a water heater having a reservoir tank 10, heating elements, modified in accordance with the invention, which are indicated generally at 12, and a thermosiphon bypass check valve indicated generally at 50. The heating elements 12 are mounted through the sidewall of the tank 10. A cold water inlet 14, substantially immersed in the tank 10, delivers cold water through the tank's top wall into a lower region 18 below the bottom-most heating element 12. A hot water outlet 16 allows heated water to be drawn from an upper region 20 above the upper-most heating element 12. A hot water supply line heat trap 46 is positioned above the thermosiphon bypass check valve 50 on the hot water outlet 16 and a cold water supply line heat trap 48 is positioned above the thermosiphon bypass check valve 50 on the cold water inlet 14. These heat traps are of a conventional design which some states require to meet efficiency standards. With the exception of the modification to the heating elements 12 and the addition of the thermosiphon bypass check valve 50, both which will be further described below, the type of water heater construction described thus far is conventional. A person skilled in the art would be familiar with the same, including its usual mode of operation.

Referring now to FIGS. 2–6, therein is shown the above-mentioned modified heating elements 12. Each heating element 12 includes a conventional metallic sheathed electric resistance heating element 30 of the Calrod® type which extends horizontally into the tank 10 from the tank's inner sidewall. The heating element 30 is surrounded by a cylindrical tubular sleeve 24 which is preferably made of copper or a copper alloy, although it should be appreciated that many other suitable materials could be used. The sleeve 24 has a closed outer end 26 and an open inner end 28. The inner end 28 permits the sleeve 24 to be placed or slid over the heating element 30 until the open end 28 abuts against a threaded plug 34 which mounts the calrod to the tank 10. One or more slotted disks 32 may be used to properly space the inner sidewall 33 of the sleeve 24 from the heating element 30. The heating element 30 and plug 34 are of a conventional design. The doubled-back configuration of the heating element 30 is also conventional, although, preferably, each heating element segment 30A, 30B should be aligned in a substantially horizontal plane as shown in FIGS. 4–6.

Positioned in the sleeve 24, above heating element segments 30A, 30B, are a plurality of openings 36 which extend along the length of the sleeve 24. As shown in FIG. 7, positioned below the heating element 30 is a second plurality of openings 38, which also extend along the length of the sleeve. It is important that the total area of the upper openings 36 exceed the area of the lower openings 38. This configuration is important for reasons which will be further described.

By way of nonlimitative example, the upper sleeve openings 36 may include three separate rows of openings and the lower openings 38 may include a single row. It is possible, and perhaps desirable, that each individual opening 36 above the heating element 30 have an area that is less than the area of each individual opening 38 below the heating element 30. However, the total area of all openings above must exceed the total area of all openings below.

Referring to FIG. 8, therein is shown an unmodified water heater tank 10. This tank includes upper and lower calrods 39, 41, which are the same in form as the heating elements 30 illustrated in FIGS. 2–6, but which are unmodified. During normal operation, the upper heating element 39 is activated until a temperature sensor (not shown in the drawings) positioned immediately above this heating element 39 indicates a certain preselected temperature. Then, the lower heating element 41 is activated until a second temperature sensor (also not shown in the drawings) in the vicinity of the lower heating element 41 also indicates the preselected temperature. The resultant effect of such operation is that warmer layers of water, indicated at 44, are developed near and immediately above the heating elements 39, 41, and colder layers 42 are developed immediately below. These layers inhibit heat circulation throughout the entire tank.

When the tank is modified in accordance with my prior invention, U.S. Pat. No. 4,77,347, as shown in FIG. 9, an external bypass conduit 22 interconnects the upper and lower tank regions 20, 18. This conduit has no valves or other flow-restricting devices. The sleeves 24 hold or "trap" water inside each sleeve 24 near each heating element 12. Water inside the sleeve is therefore heated more quickly than it would be without the sleeve. This quicker heating action causes local temperatures of the water near the heating element 12 to be substantially higher than local temperatures of the water near an unmodified heating element. In fact, the higher temperatures may cause localized boiling, which probably never occurs with heating elements not positioned in such a sleeve.

When a thermosiphon bypass check valve 50 is configured in accordance with the present invention, as shown in FIG. 10, the bypass valve 50 extends between the hot water outlet 16 and the cold water inlet 14 both near the top of the tank. Thus, unlike my prior invention, the tank 10 is not modified to have a lower inlet that allows heated water to circulate through the tank.

In addition, the cold water inlet 14, sometimes known as a "dip tube," delivering cold water to the lower region 18 should not have any openings along the length of its sidewalls. Therefore, because some pre-existing water heaters have openings in the sidewall of the cold water inlet 14, these openings should be sealed to obtain maximum efficiency for this invention. In addition, for the best efficiency results, the cold water inlet 14 should deliver cold water substantially directly underneath the bottom-most heating element as shown in FIG. 10. This can be accomplished by adding a "J"-shaped bend or a 90 degree elbow at the lower end of the cold water inlet 14 and adding piping or tubing in a substantially horizontal direction until the outer end is beneath the middle of the bottom-most heating element. In preferred form, a series of openings may be added to the upper side of the horizontally-extending portion 18 of the cold water inlet.

Referring now to FIG. 11, if the conventional water heater assembly includes heat traps 46,48, as stated earlier, the hot supply heat trap 46 is repositioned above the bypass valve 50 on the hot water outlet 16 and the cold supply heat trap 48 is repositioned above the bypass valve 50 on the cold water inlet 14. The thermosiphon bypass check valve 50 comprises a bypass conduit 52, constrictions indicated at 54, and a closure member 56. The combination of at least one constriction 54 and a closure member 56 may be referred to as a flow control valve.

The bypass conduit 52 has an upper end 58 and a lower end 60. The upper end 58 is connected to the cold water inlet 14 and the lower end 60 is connected to the hot water outlet 16. The constrictions 54 are preferably annular and may be formed using several methods, one such method is by rolling a piece of ordinary copper pipe. There is an upper end constriction 54A and a lower end constriction 54B. It is preferable to have the bypass conduit 52 be bilaterally symmetrical about its mid-axis 68. When constructed in this manner, the bypass conduit 52 will function properly independently of the positions of the cold water inlet 14 and the hot water outlet 16 on the water tank 10. Therefore, if the cold water inlet 14 and the hot water outlet 16 were in reverse positions from that shown in FIG. 11, the bypass conduit should also be reversed and would still function properly. In order to obtain the necessary inclination and symmetry, the bypass conduit 52 may be constructed such that both end portions have tubing or piping with the annular constriction, each end portion is then connected to a conventional 45 degree elbow, with tubing or piping extending between the two elbows.

The closure member 56, preferably a spherical ball, is positioned inside the bypass conduit 52. Any suitably shaped closure member could be used as long as the diameter of the closure member is greater than the constriction diameter and less than the bypass conduit diameter, thus allowing the closure member 56 to adequately obstruct waterflow through the bypass conduit in one position and to allow adequate waterflow around the closure member and through the bypass conduit 52 in a second position. The closure member 56 is either positioned in a closed position as shown in FIG. 11, or in an open position as shown in FIG. 12.

Referring to FIG. 11, when both the heat traps 46, 48 are in an open position, the water in the cold water inlet 14 flows through both the cold water inlet 14 and through the bypass conduit 52 as indicated generally by arrows 62. The cold waterflow through the bypass conduit 52 causes the closure member 56 to abut the lower end constriction 54B, thus allowing little or no heated water to flow through the bypass conduit 52. When in this condition, the thermosiphon bypass check valve 50 is said to be in the closed position.

Figure 12:
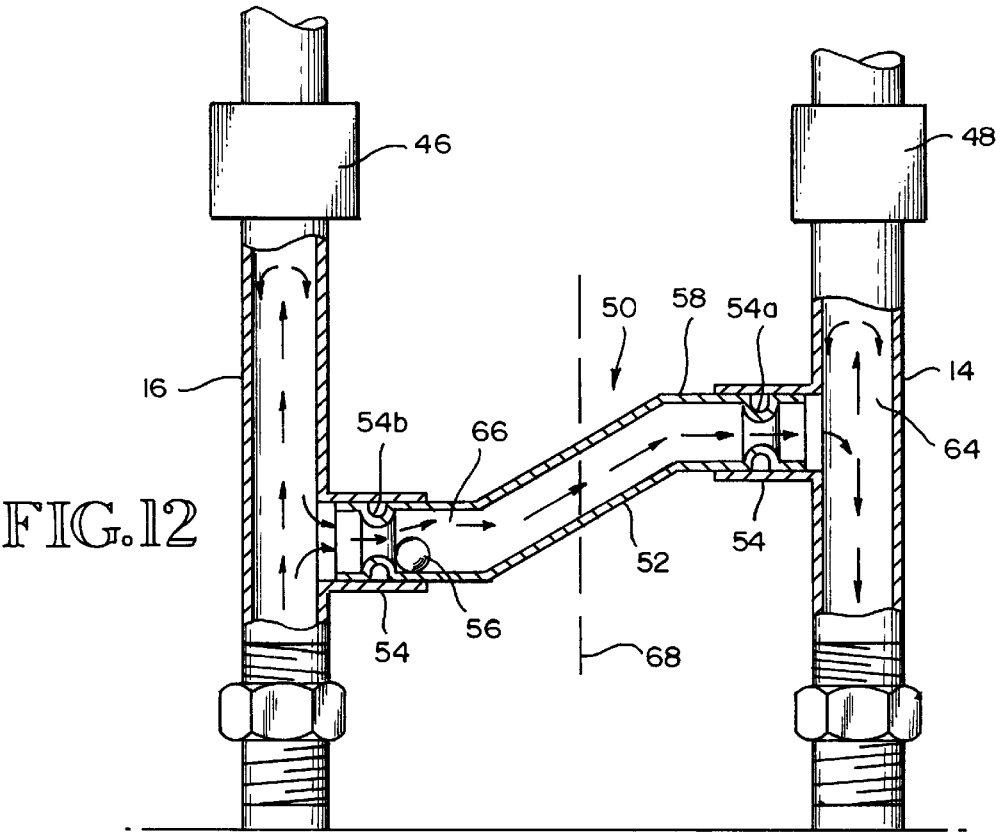
FIG. 12 is an enlarged side view of the thermosiphon bypass valve shown in FIG. 1 operating in an open position.

Referring to FIG. 12, when both the heat traps 46, 48 are in a closed position, the water in the cold water inlet 14 generally remains in the cold water inlet 14 as indicated generally by arrows 64 and does not flow into the bypass conduit 52. When this occurs, the closure member 56, having a specific gravity greater than water, settles to the bottom of the bypass conduit 52 and allows heated water to flow over the closure member 56 as indicated generally by arrow 66. When in this condition, the thermosiphon bypass check valve 50 is said to be in the open position.

As a person skilled in the art would know, the thermosiphonic action is the result of heated water tending to rise upwardly. However, because the thermosiphonic action is relatively weak, in order for the present invention to function properly, the closure member 56 must allow the free flow of heated water to flow up and over the closure member 56 when the thermosiphon bypass check valve 50 is in the open position. In order to accomplish this, it is preferable that the closure member 56 have a diameter only slightly larger than the annular constriction 54. In addition, it is preferable to have the annular constriction 54 centered radially within the bypass conduit 52. When configured in this manner, once the closure member 56 settles to the bottom of the bypass conduit 52, there is sufficient space above the closure member 56 to allow the free flow of heated water above the closure member 56. For this upwardly flow of heated water to continue through the bypass conduit 52, the bypass conduit 52 must be inclined so that the heated water continues to rise until it reaches the upper end 58, which is connected to the cold water inlet 14.

As would be apparent to a person skilled in the art, a constriction on both ends of the bypass conduit is not necessary for the proper operation of the bypass valve. Also, the operation of the thermosiphon bypass check valve would operate the same whether or not the heat traps were installed. Therefore, the heat traps are not necessary for the proper operation of my invention.

Figure 13:
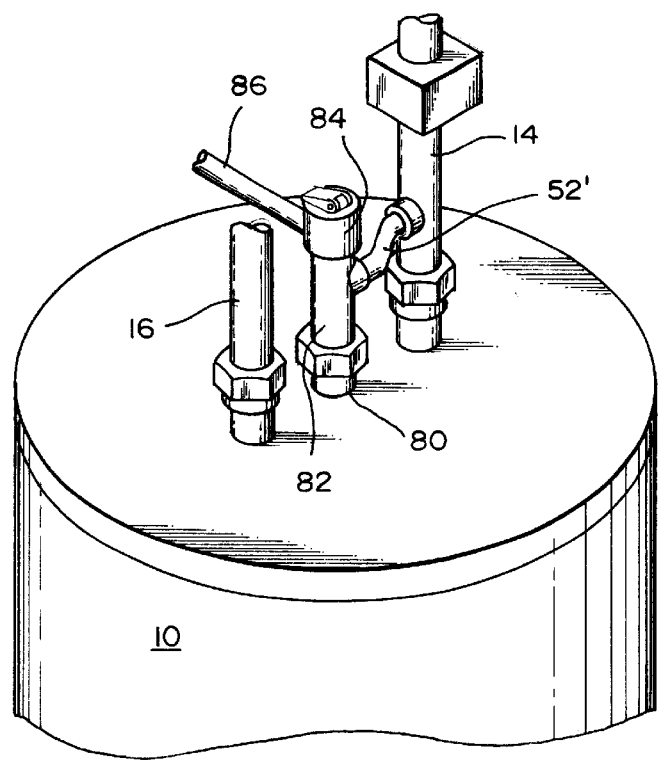
FIG. 13 is an enlarged scale fragmentary view of the upper portion of FIG. 1, showing a second hot water discharge conduit and the bypass conduit extending from the second hot water discharge conduit to the cold water inlet conduit.
Figure 14:
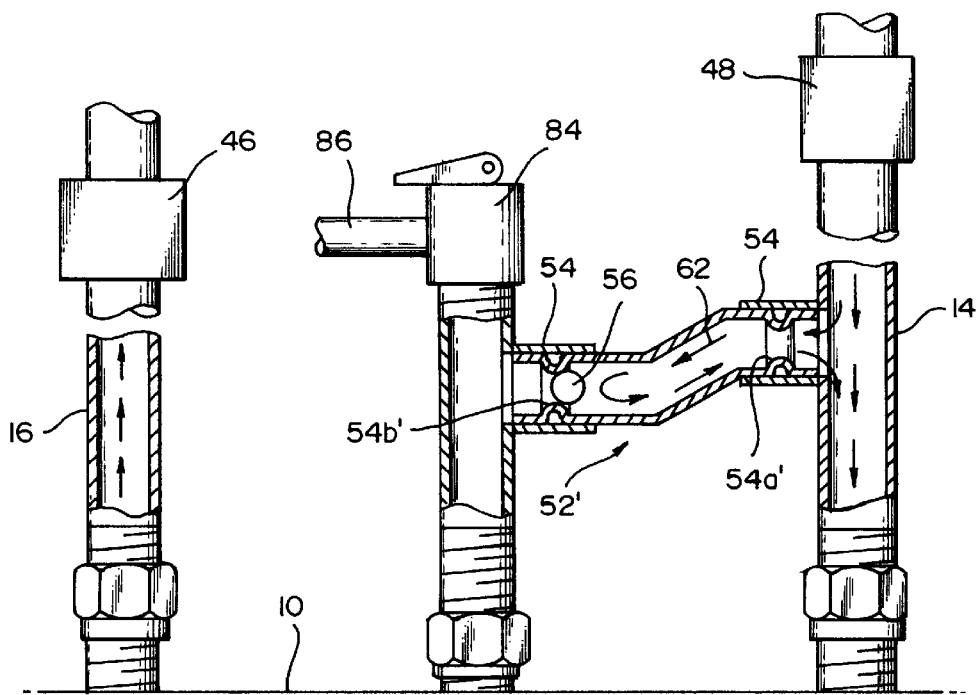
FIG. 14 is a view like FIG. 11, but of the inlet/outlet conduit assembly that is shown by FIG. 13.
Figure 15:
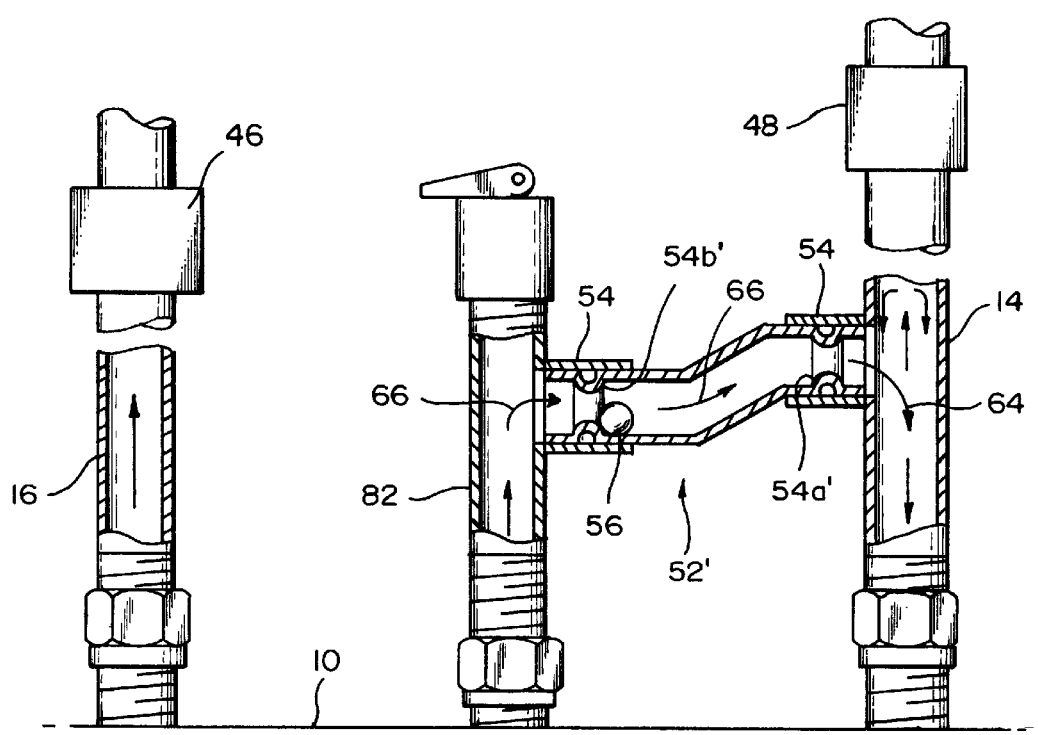
FIG. 15 is a view like FIG. 12, but showing the inlet/outlet conduit assembly of FIGS. 13 and 14.

The layering of warm and cold water found in other water heaters and described previously, along with the necessity to modify the existing water heater tank to get better circulation and water efficiency, is thus eliminated with this improved water heater apparatus. The heating of water using a sleeve, as described above, generates an upwardly directed flow of heated water 40 (see FIGS. 5 and 6) and the thermosiphon bypass check valve, as described above, in combination, generate a thermosiphon effect that causes heated water in the tank's upper region 20 to be "rolled-over" to the tank's lower region 18 without modifying the water heater tank 10. This apparatus can be easily installed in pre-existing electric water heaters without significant modification to the tank. FIGS. 13–15 disclose a modified embodiment of the invention. It is incorporated into a hot water tank having an inlet conduit 14 and an outlet conduit 16, the same as the embodiment shown by FIGS. 1–7 and 10–12. The interior of the tank 10 is as shown in FIGS. 1 and 10.

The embodiment of FIGS. 13–15 differs from the earlier embodiment in that a third conduit is provided at the top of the tank 10. It is known to provide a tank with an opening 80 in its top which receives the lower end of a pressure relief conduit 82. The pressure relief conduit 82 is normally short and includes a standard relief valve 84 at its top. The housing of the relief valve 84 includes a discharge conduit 86 that leads to drain. The relief conduit is a hot water outlet conduit. It and conduit 16 are both hot water outlet conduits. It has been found that it is desirable to practice the invention by connecting the bypass conduit 52' between the relief conduit 82 and the inlet conduit 14. In order to make this connection, it is necessary to provide a longer relief tube 82 that is normally used. The longer tube 82 elevates the position of the relief valve 84. It also provides a conduit section between the tank 10 and the relief valve 84 to which the lower end of the bypass conduit 52' can be connected.

Referring to FIG. 14, when both of the heat traps 46, 48 are in an open position, the water in the cold water inlet 14 flows through both the cold water inlet 14 and through the bypass conduit 52' as indicated generally by arrows 62. The cold water flow through the bypass conduit 52' causes the closure member 56 to abut the lower end constriction 54B' thus allowing little or no heater water to flow through the bypass conduit 52'. When it is conditioned, the thermosiphon bypass check valve 50 is said to be in a closed position.

Referring to FIG. 15, when both the heat traps 46, 48 are in a closed position, the water in the cold water inlet 14 generally remain in the cold water inlet 14 as indicated generally by arrows 64 and does not flow into bypass conduit 62'. When this occurs, the closure member 56, having a specific gravity greater than water, settles to the bottom of the bypass conduit 52'. This allows heated water to flow over the closure member 56 as indicated generally by arrow 66. When in this condition, the thermosiphon bypass check valve 50 is said to be in an open position.

As a person skilled in the art would know, the thermosiphonic action is the result of heated water tending to rise upwardly in the tank 10 and out from the tank 10. However, because the thermosiphonic action is relatively weak, in order for the present invention to function properly, the closure member 56 must allow the free flow of heated water to flow up and over the closure member 56 when the thermosiphonic bypass check valve 50 is in the opening position. As is claimed above, in order to accomplish this, it is preferable that the closure member 56 have a diameter only slightly larger than the annular constriction 54. In addition, it is preferable to have the annular constriction 54B' centered radially within the bypass conduit 52. When configured in the manner, once the closure member 56 settles to the bottom of the bypass conduit 52', there is sufficient space above the closure member 56 to allow the free flow of heated water above the closure member 56. For this upper flow of heated water to continue to the bypass conduit 52', the bypass conduit 52' must be inclined so that the heated water continues to rise until it reaches the upper end where it is connected to the cold water inlet 14.

It is believed that the embodiment shown by FIGS. 13–15 would cost less to build than the embodiment shown by. FIGS. 1–7 and 10–12. Also, the embodiment of FIGS. 13–15 does not result in the formation of a "water hammer" in the hot water conduit 16.

This invention may also be used advantageously with conventional gas water heaters. Of course, in such an application, the internal heating element sleeves are not used. Instead, only the external bypass 50 is used between the cold water inlet and hot water outlet. It is especially important in gas water heater applications that the cold water inlet end be elevated above the connection to the hot water outlet and that the flow control valve not restrict thermosiphonic flow long an upper portion of the bypass conduit.

It is to be understood that the embodiments described above is the current best mode for carrying out the invention. It is possible, however, that the invention may be implemented in ways other than that which was described above without departing from the invention's spirit and scope. The embodiment illustrated and described above is merely an example, although it is believed to be the best example known at this time. Any patent protection due the inventor is not to be determined by the above embodiment, but is to be determined only by a proper interpretation of the following claim or claims, wherein such interpretation is to be made in accordance with the well-established doctrines of patent claim interpretation including the doctrine of equivalents and reversal of parts.

What is claimed is:

1. In a water heater having an elongated vertically disposed water tank adapted to be normally filled with water, a cold water inlet conduit for delivering cold water to a lower region of the tank, a hot water outlet conduit for removing heated water from an upper region of the tank, and at least one elongated heating element positioned in the tank so as to be immersed in the water between the upper and lower regions, the at least one heating element extending generally horizontally into the tank from an inner sidewall of the tank to heat water in the tank, the improvement comprising a thermosiphonic apparatus for improving the efficiency of the water heater, the apparatus comprising:

an elongated tubular sleeve having a closed end and surrounding each of the at least one heating element, each sleeve having a first plurality of upper openings for providing waterflow communication between the sleeve's inside and outside, the first plurality of openings being distributed along substantially the entire length of the sleeve and being normally positioned above the heating element within the sleeve, and a second plurality of lower openings for providing waterflow communication between the sleeve's inside and outside, the second plurality of openings being distributed along substantially the entire length of the sleeve and being normally positioned below the heating element, the total area of the upper openings being greater than the total area of the lower openings, whereby upon operation of the at least one heating element, the sleeve generates along substantially the entire length thereof an upwardly directed transverse waterflow through the sleeve and in a direction from the second plurality of openings to the first plurality of openings;

a bypass conduit positioned externally of the tank and positioned to cause delivery of heated water from the hot water outlet conduit to the cold water inlet conduit, the bypass conduit having an upper end connected to the cold water inlet conduit and a lower end connected to the hot water outlet conduit, said bypass conduit extending upwardly from its connection with the hot water outlet conduit to its connection with the cold water inlet conduit, so that hot water will rise in the bypass conduit, from the hot water outlet conduit to the cold water inlet conduit; and a flow control valve in the bypass conduit having an open position and a closed position, such that in the open position hot water flows from the hot water outlet conduit to the cold water inlet conduit and in the closed position waterflow is obstructed from flowing from the hot water outlet conduit to the cold water inlet conduit;

wherein the cold water inlet conduit is substantially immersed within the tank and comprises sidewalls and an open lower end, said sidewalls extending generally vertically downwardly within the tank from an upper wall of the tank to the lower region of the tank, whereby the operation of the bypass conduit cooperatively with the at least one heating element surrounded with the sleeve causes heated water to be circulated by thermosiphonic action in the tank through the bypass conduit from the upper region to the lower region.

2. The apparatus of claim 1, wherein the sidewalls of the cold water inlet conduit are free of side openings for the entire length of the cold water inlet conduit.

3. The apparatus of claim 1, wherein the flow control valve comprises an annular constriction on the lower end of the bypass conduit and a closure member such that the closure member allows waterflow through the annular construction when the closure member is in an open position and obstructs waterflow through the annular construction when the closure member is in a closed position.

4. The apparatus of claim 3, further comprising an annular constriction on the upper end of the bypass conduit.

5. The apparatus of claim 4, wherein the closure member is a substantially spherical object sized smaller than the bypass conduit and larger than the annular constriction.

6. The apparatus of claim 5, wherein the sidewalls of the cold water inlet conduit are free of side openings for the entire length of the cold water inlet conduit.

7. The apparatus of claim 3, wherein the closure member is a substantially spherical object sized smaller than the bypass conduit and larger than the annular constriction.

8. The apparatus of claim 7, wherein the sidewalls of the cold water inlet conduit are free of side openings for the entire length of the cold water inlet conduit.

9. The apparatus of claim 1, wherein the lower end of the cold water inlet conduit is positioned to deliver water substantially directly below the at least one heating element.

10. The apparatus of claim 9, wherein the at least one heating element comprises a bottom-most heating element and at least one upper heating element and the cold water inlet conduit is positioned to deliver water substantially directly below the bottom-most heating element.

11. The apparatus of claim 10, wherein the flow control valve comprises an annular constriction on the lower end of the bypass conduit and a closure member such that the closure member allows waterflow through the annular constriction when the closure member is in an open position and obstructs waterflow through the annular constriction when the closure member is in a closed position.

12. The apparatus of claim 11, further comprising an annular constriction on the upper end of the bypass conduit.

13. The apparatus of claim 12, wherein the closure member is a substantially spherical object sized smaller than the bypass conduit and larger than the annular constriction.

14. The apparatus of claim 13, wherein the sidewalls of the cold water inlet conduit are free of side openings for the entire length of the cold water inlet conduit.

15. The apparatus of claim 11, wherein the closure member is a substantially spherical object sized smaller than the bypass conduit and larger than the annular constriction.

16. The apparatus of claim 15, wherein the sidewalls of the cold water inlet conduit are free of side openings for the entire length of the cold water inlet conduit.

17. A water heater, comprising:
a water tank having a top, a bottom and a sidewall;
a cold water inlet conduit entering the tank through the top of the tank, and extending downwardly through the tank to a discharge opening at a lower region in the tank;
a hot water outlet conduit extending upwardly from the top of the tank;
at least one heater in said tank, for heating water in the tank;
a bypass conduit above the top of the tank, said bypass conduit having a lower end connected to the hot water outlet conduit and an upper end connected to the cold water inlet conduit, said bypass conduit extending upwardly from its connection with the hot water outlet conduit to its connection with the cold water inlet conduit, so that hot water will rise in the bypass conduit, from the hot water outlet conduit to the cold water inlet conduit; and
whereby cold water with hot water added to it will flow downwardly through the cold water inlet conduit, through the tank, to be discharged into the tank at the lower region of the tank.

18. The water tank of claim 17, comprising a flow control valve in the bypass conduit, said flow control valve having an open position and a closed position, such valve when in its open position allowing hot water to flow from the hot water outlet conduit into the cold water inlet conduit, and when in a closed position preventing hot water from flowing from the hot water outlet conduit into the cold water inlet conduit.

19. The apparatus of claim 1, wherein the hot water outlet conduit includes a relief valve and an outlet leading from the relief valve to drain, and the lower end of the bypass conduit is connected to the hot water outlet below the relief valve.

20. The apparatus of claim 19, comprising a second hot water outlet conduit extending upwardly from the top of the tank.

21. The water tank of claim 17, wherein the hot water outlet conduit includes a relief valve and an outlet leading from the relief valve to drain, and the lower end of the bypass conduit is connected to the hot water outlet below the relief valve.

22. The water tank of claim 21, comprising a second hot water outlet conduit extending upwardly from the top of the tank.

\* \* \* \* \*